United States Patent Office 2,915,525
Patented Dec. 1, 1959

2,915,525
PREPARATION OF ARYLENEBENZOXAZOLOLS AND ARYLENEBENZOTHIAZOLOLS

Fred Applegath and Raymond A. Franz, El Dorado, Ark., assignors to Monsanto Chemical Company, St. Louis, Mo., a corporation of Delaware No Drawing. Application March 18, 1957
Serial No. 646,577

8 Claims. (Cl. 260—304)

The present invention relates to a new process for the production of azoles.

Azoles can be prepared by reacting 2-hydroxy and 2-thiol substituted mono-primary-arylamines with carbonyl sulfide (COS). This process, however, requires exceptionally long reaction periods to produce any practical yields of the desired azole.

It is an object of this invention to provide an improved process for the production of azoles. It is a further object of this invention to provide an improved process for the production of azoles from carbonyl sulfide and 2-hydroxy and 2-thiol substituted mono-primary-arylamines. Other objects will become apparent from the description of the invention.

It has now been discovered that azoles can be prepared by reacting at an elevated temperature carbonyl sulfide and a compound selected from the group consisting of 2-hydroxy substituted mono-primary-arylamines and 2-thiol substituted mono-primary arylamines in the presence of an alkaline catalyst having a dissociation constant greater than $1 \times 10^{-10}$. The following examples illustrate this invention.

Example I

A stainless steel autoclave is charged with 0.20 mol of o-aminobenzenethiol, 0.40 mol of COS (100 p.s.i.g. in the autoclave), 50 ml. of methanol and 0.02 mol of triethylamine. The autoclave is heated for 3½ hours at 115° C. after which time the autoclave is vented, opened, and the reaction products rinsed therefrom with methanol. The mixture thus obtained is evaporated to near dryness, precipitating the desired product which is removed by filtration and washed with cold benzene. A good yield of 2-hydroxybenzthiazole is obtained.

Example II

The procedure set forth in Example I is repeated using in place of the o-aminobenzenethiol 0.20 mol of o-aminophenol. An excellent yield of 2-benzoxazolol is obtained.

Example III

Procedure set forth in Example 1 is repeated using in place of o-aminobenzenethiol, 0.20 mol of β-thiol-α-naphthylamine. An excellent yield of 2-hydroxy-β-naphthathiazole is obtained.

Example IV

Procedure set forth in Example I is repeated using in place of o-aminobenzenethiol, 0.20 mol of a α-thiol-β-naphthylamine. An excellent yield of 2-hydroxy-α-naphthathiazole is obtained.

Example V

The procedure set forth in Example I is repeated using in place of o-aminobenzenethiol, 0.20 mol β-hydroxy-α-naphthylamine. An excellent yield of 2 - hydroxy-β-naphthoxazolol is obtained.

Example VI

The procedure set forth in Example I is repeated using in place of o-aminobenzenethiol, 0.20 mol α-hydroxy-β-naphthylamine. An excellent yield of 2 - hydroxy-α-naphthoxazolol is obtained.

Example VII

The procedure set forth in Example I was repeated using in place of triethylamine 0.02 mol of sodium oleate. An excellent yield of 2-hydroxybenzthiazole is obtained.

Example VIII

The procedure set forth in Example I is repeated using in place of triethylamine 0.02 mol of triethanolamine. An excellent yield of 2-hydroxybenzthiazole is obtained.

Example IX

The procedure set forth in Example I is repeated using in place of triethylamine 0.02 mol of potassium hydroxide. An excellent yield of 2-hydroxybenzthiazole is obtained.

In each of the preceding examples the yields obtained are significantly higher than yields obtained by the same process carried out in the absence of an alkaline catalyst.

Any 2-hydroxy or 2-thiol substituted mono-primary-arylamine can be used in this process. By mono-primary-arylamine is meant an aryl compound containing not more than one $NH_2$ group attached to an aromatic carbon atom. These amines may be further substituted with one or more substituent groups which are inert under conditions of the reaction, i.e. do not prevent the formation of any of the desired azoles. Typical of substituent groups that can be present on the aryl radical are halogens, including chlorine, bromine, fluorine and iodine, alkyl, alkoxy, aralkyl, dialkylamino, hydroxy, thiol, nitro, cyano, cyanoalkyl, cyanoalkoxy, etc. In the case of any of the alkyl substituents, alkyl groups containing from 1 to 18 carbon atoms are preferred. The mono-primary-arylamines can be monosubstituted or polysubstituted with one or more of the above mentioned groups.

The reaction temperature may also be substantially varied. Elevated temperatures are used. A temperature of at least 60° C. is preferred and temperatures as high as 200° C. can be employed. Temperatures in the range of from about 70° C. to about 150° C. are particularly preferred.

While the reaction will take place at atmospheric pressure, elevated pressures are preferred. A reaction pressure varying from about 25 p.s.i.a. (pounds per square inch absolute) to about 250 p.s.i.a. is particularly advantageous. Reaction pressures as high as 500 p.s.i.a. or even higher can be used if desired but offer no particular advantage.

The proportions of reactants used in this process are also subject to substantial variation. The mole ratio of carbonyl sulfide to the arylamine can be varied from about 0.5:1 to about 4:1.

If desired the process can be carried out in the presence of an inert solvent or diluent. For this purpose alkyl alcohols containing from 1 to 8 carbon atoms are preferred. Other diluents which can be employed in this reaction are hydrocarbons, halogenated hydrocarbons, mineral oils, ethers, amines, glycols and acid amides. Water per se is not a preferred diluent although it can be present in minor amounts in the organic diluent. The following are examples of materials that can be employed as diluents: ligroin, isopropanol, isopropyl ether, ethanol, pyridine, isopropanol-water, ethylene glycol, methyl Cellosolve, tetrahydrofurfuryl alcohol, N,N-dimethylaniline, N,N-diethyl-ethanolamine, formamide, amyl alcohol, and benzene.

Any alkaline material having a dissociation constant greater than about $1 \times 10^{-10}$ can be used as the alkaline catalyst in this reaction. For this purpose tertiary alkyl amines containing from 1 to 18 carbon atoms are particularly preferred. Other catalysts that can be used are quaternary ammonium hydroxides, alkaline earth metal hydroxides, the alkali metal hydroxides, of which sodium hydroxide and potassium hydroxide are particular examples, alkaline alkali metal salts, such as sodium oleate, N,N-dimethylbenzylamine, N,N-diethyl-p-toluidine, tri-n-hexylamine, triethanolamine, N,N-diethyloctadecylamine, a mixture of magnesium oxide and methanol, and a mixture of calcium and methanol. The quantity of alkaline material used for the catalyst can also be varied substantially. Minor amounts are preferred. From about 0.002 to about 0.2 mole of the alkaline catalyst per mole of the arylamine has been found to be particularly useful.

After the reaction is complete the azole can be recovered from the reaction mixture by any method well-known to those skilled in the art.

What is claimed is:

1. A process for preparing azoles which comprises reacting by mixing at an elevated temperature and a pressure of at least 25 p.s.i.a. carbonyl sulfide and a compound selected from the group consisting of 2-hydroxy substituted mono-primary arylamines and 2-thiol substituted mono-primary arylamines in the presence of an alkaline catalyst having a dissociation constant greater than $1 \times 10^{-10}$.

2. A process as described in claim 1 wherein the reaction is carried out at a temperature in the range of from about 70° C. to about 150° C.

3. A process as described in claim 2 wherein the reaction is carried out in an inert diluent.

4. A process as described in claim 3 wherein the alkaline catalyst is a tertiary amine.

5. A process for preparing 2-hydroxybenzthiazole which comprises reacting by mixing o-aminobenzthiol and carbonyl sulfide at a temperature in the range of from about 70° C. to about 150° C. and a pressure of at least 25 p.s.i.a. in the presence of a tertiary amine having a dissociation constant greater than about $1 \times 10^{-10}$.

6. A process for preparing benzoxazolol which comprises reacting by mixing o-aminophenol and carbonyl sulfide at a temperature in the range of from about 70° C. to about 150° C. and a pressure of at least 25 p.s.i.a. in the presence of a tertiary amine having a dissociation constant greater than about $1 \times 10^{-10}$.

7. A process for preparing 2-hydroxy-α-naphthathiazole which comprises reacting by mixing α-thiol-β-naphthylamine and carbonyl sulfide at a temperature in the range of from about 70° C. to about 150° C. and a pressure of at least 25 p.s.i.a. in the presence of a tertiary amine having a dissociation constant greater than about $1 \times 10^{-10}$.

8. A process for preparing 2-hydroxy-β-naphthathiazole which comprises reacting by mixing β-thiol-α-naphthylamine and carbonyl sulfide at a temperature in the range of from about 70° C. to about 150° C. and a pressure of at least 25 p.s.i.a. in the presence of a tertiary amine having a dissociation constant greater than about $1 \times 10^{-10}$.

References Cited in the file of this patent

UNITED STATES PATENTS 2,615,025    Lutz                  Oct. 21, 1952

OTHER REFERENCES

Hogelloch: Chem. Abstracts, vol. 44, col. 9937–8 (1950).